(12) United States Patent
Ru

(10) Patent No.: US 7,817,024 B2
(45) Date of Patent: Oct. 19, 2010

(54) VEHICLE TIRE WARNING SYSTEM

(76) Inventor: Changqu Ru, Rm. 902, No. 2, South New Village, South China University of Technology, Guangzhou, Guangdong (CN) 510641

(*) Notice: Subject to any disclaimer, the term of this patent is extended or adjusted under 35 U.S.C. 154(b) by 491 days.

(21) Appl. No.: 11/949,692

(22) Filed: Dec. 3, 2007

(65) Prior Publication Data
US 2008/0266074 A1  Oct. 30, 2008

(30) Foreign Application Priority Data
Apr. 29, 2007  (CN)  .................. 2007 1 0027803
May 29, 2007  (CN)  .................. 2007 1 0109389

(51) Int. Cl.
*B60C 23/00*  (2006.01)
(52) U.S. Cl. .................. 340/442; 340/443; 340/447; 340/626; 73/146.3; 73/146.8
(58) Field of Classification Search .................. None
See application file for complete search history.

(56) References Cited
U.S. PATENT DOCUMENTS

| | | | | |
|---|---|---|---|---|
| 3,697,944 A | * | 10/1972 | Murano | 340/447 |
| 3,890,595 A | * | 6/1975 | Barabino | 340/446 |
| 4,235,185 A | * | 11/1980 | Byram | 116/34 R |
| 4,468,650 A | * | 8/1984 | Barbee | 346/58 |
| 4,945,337 A | * | 7/1990 | Huang | 340/442 |
| 5,119,066 A | * | 6/1992 | Ballyns | 340/442 |
| 6,588,264 B1 | * | 7/2003 | Johnson | 73/146.8 |
| 7,343,871 B2 | * | 3/2008 | Pellicciari | 116/34 R |
| 2007/0044552 A1 | * | 3/2007 | Huang | 73/146.3 |
| 2007/0069877 A1 | * | 3/2007 | Fogelstrom | 340/442 |
| 2007/0144639 A1 | * | 6/2007 | Oh | 152/152.1 |
| 2008/0257027 A1 | * | 10/2008 | Wu | 73/146.8 |

* cited by examiner

*Primary Examiner*—Julie Lieu
(74) *Attorney, Agent, or Firm*—Moore Patents; David Dreyfuss

(57) ABSTRACT

An air pressure sensor (2) for a vehicle tire warning system includes a tubular housing (21) defining a chamber (218), an air pressure actuating device seated in the chamber and being moveable back and forth in the chamber in response to air pressure change in the vehicle tire, and a switch device to electrically connect a high air pressure warning circuit or a low air pressure warning circuit under the drive of the air pressure actuating device. The chamber of the tubular housing is communicated to the atmosphere via a connecting pipe (29).

11 Claims, 4 Drawing Sheets

VEHICLE TIRE WARNING SYSTEM

CROSS-REFERENCE TO RELATED APPLICATIONS

The present application claims priorities from Chinese Patent Applications CN 200710027803.6 filed on Apr. 29, 2007 and CN 200710109389.3 filed on May 29, 2007, the contents of which are incorporated by reference into this patent application.

FIELD OF THE INVENTION

The present invention generally relates to a vehicle tire warning system and, more particularly, to an air pressure sensor and a transmitting circuit for use in the vehicle tire warning system.

BACKGROUND OF THE INVENTION

At present, according to Wheatstone electric bridge principle, tire pressure monitoring systems (TMPS) are widely used in various kinds of vehicles to precisely and promptly monitor air pressure and temperature in vehicle tires.

However, the conventional TMPS generally needs to operate under very strict working conditions. Monitoring of air pressure and temperature in the vehicle tires is realized via an air pressure sensor and a temperature sensor, respectively. Typically, the air pressure sensor and the temperature sensor must be powered continuously. Otherwise, they may lose their basic role of monitoring. After long time of electrification, lifespan of battery in the TMPS is considerably shortened and the TMPS itself may potentially warn mistakenly.

Conventional mechanical or electrical air pressure sensors generally define a chamber therein, and the chamber must be strictly vacuum-pumped. After the air pressure sensor works at high or low temperatures or under humidity for some time, air volume in the chamber will change, which may accordingly lead to a linkage mechanism of the air pressure sensor to move and induce malfunction of the air pressure sensor.

Actually, it is very difficult to set the chamber in perfect vacuum. Even if the vacuum degree in the chamber is reasonably high, the air from the atmosphere still can penetrate the surface of the vehicle tire and enter the chamber, which will inevitably lead to the chamber be filled with air gradually. Therefore, as long as the air pressure sensor's work relies on the vacuum degree of the chamber, the performance of the air pressure sensor will deteriorate consequentially and lifespan of the air pressure sensor will be shortened accordingly. In other words, performance of the vehicle tire warning system is directly determined by the lifespan of the battery and the vacuum degree in the air pressure sensor.

What is needed, therefore, is to provide a vehicle tire warning system which can promptly monitor the air pressure and the temperature in the vehicle tires.

SUMMARY OF THE INVENTION

One object of the present invention is to provide a vehicle tire warning system which can promptly and precisely monitor the air pressure in vehicle tires, wherein an air pressure sensor for use in the vehicle tire warning system consumes no electricity under standard air pressure and performance thereof does not depend on the vacuum degree of a chamber defined therein.

Another object of the present invention is to provide an air pressure sensor without the design of vacuum chamber, which can electrically connect different warning circuits under command, so as to prolong the lifespan of the vehicle tire warning system.

According to one embodiment of the present invention, an air pressure sensor for a vehicle tire warning system includes a tubular housing defining a chamber, an air pressure actuating device seated in the chamber and being moveable back and forth in the chamber in response to air pressure change in the vehicle tire, and a switch device for electrically connecting a high air pressure warning circuit or a low air pressure warning circuit under the drive of the air pressure actuating device. The chamber of the tubular housing is communicated to the atmosphere via a connecting pipe Specifically, the air pressure actuating device includes a flexible pressure sensitive component for sensing the air pressure in the vehicle tire, a linkage mechanism assembled to the flexible pressure sensitive component, a supporting mechanism coupled to the tubular housing, and an elastic element set between the supporting mechanism and the linkage mechanism. The flexible pressure sensitive component can drive the linkage mechanism to move back and forth in the chamber in response to air pressure change in the vehicle tire.

Specifically, the supporting mechanism defines a through hole for suitably receiving the connecting pipe Specifically, the supporting mechanism includes a sleeve assembled to the tubular housing and a securing element engageably coupled to the sleeve, the securing element is provided with a through hole for suitably receiving the connecting pipe.

Specifically, the vehicle tire is provided with a fastener defining an air inlet therein. The fastener resists the flexible pressure sensitive component against the tubular housing.

Specifically, the linkage mechanism includes a linking base on the flexible pressure sensitive component and a core shaft attached to the linking base.

Specifically, the linkage mechanism and the supporting mechanism each is provided with a spring seat and the elastic element is set between the two spring seats.

Specifically, the elastic element is a cylindrical spring or a conical spring.

Specifically, the connecting pipe has a curved shape.

Specifically, the switch device includes a conductive lug boss on the linkage mechanism and a first conduct piece and a second conduct piece seated at two sides of the conductive lug boss. The first and second conduct pieces are fixed to the tubular housing and electrically connected with a high air pressure warning circuit and a low air pressure warning circuit, respectively. The supporting mechanism functions as a shared conduct piece of the high air pressure warning circuit and the low air pressure warning circuit. The conductive lug boss is initially positioned apart from the first and second conduct pieces to cut off the low air pressure warning circuit and the high air pressure warning circuit, and is actuated to contact with the first conduct piece or the second conduct piece in response to the air pressure change in the vehicle tire so as to electrically connect the high air pressure warning circuit or the low air pressure warning circuit.

Specifically, the tubular housing is provided with an aperture. The conduct pieces each is coupled with a leading-out wire, and the leading-out wires extend outside of the tubular housing via the aperture.

Specifically, the switch device is further provided with electrically insulating supporters enclosing the first and second conduct pieces. The supporters are fixed to the inner wall of the tubular housing and each correspondingly defines a passage for suitably receiving the linkage mechanism.

According to one embodiment of the present invention, a vehicle tire warning system includes a sensing device for sensing air pressure and/or temperature in vehicle tire and converting the data of the air pressure and/or the temperature into electrical signals, a transmitting device for transmitting the electrical signals of the air pressure and/or the temperature, a receiving device for detecting the electrical signals from the transmitting device and outputting warning signals, and an independent power source to power the sensing device and the transmitting device. The sensing device includes an air pressure sensor as previously recited and the air pressure sensor is electrically connected to the transmitting device via leading-out wires attached thereto.

Specifically, the transmitting device includes a high air pressure warning circuit and a low air pressure warning circuit.

Specifically, the independent power source, the air pressure sensor, the memory alloy temperature sensor and the transmitting device are all disposed in a case, and the case is provided with a standard tire valve.

Specifically, a bracket is provided between the standard tire valve and the case.

Specifically, the independent power source is a battery.

According to one embodiment of the present invention, a transmitting circuit for a vehicle tire warning system to transmit wireless signals via trigger and connection of an air pressure sensor is provided. The transmitting circuit is controlled by an eight bit single chip PIC12C508A. VDD end of the single chip is connected to D_IN output ports of the air pressure sensor via three diodes to form a signal switching circuit. On detecting danger signals, the air pressure sensor outputs a high voltage to conduct the diodes and provides the VDD end with a threshold voltage to activate the PIC12C508A to work. The D_IN ports each provides GP0/GP1/GP3 with marking signal via 1K resistances to indicate temperature warning, high air pressure warning and low air pressure warning, respectively. The single chip PIC12C508A processes the marking signals and outputs warning signals via a GP4 port. A coding chip PT2240B codes the warning signal impulses and transmits the coded signals via an antenna.

The air pressure sensor according to the embodiment of the present invention has no design of vacuum chamber. Detection of the air pressure in the vehicle tire can be carried out while the air pressure sensor is communicated with the atmosphere via the connecting pipe. Therefore, malfunction of the air pressure sensor due to vacuum leakage can be effectively avoided. Additionally, the high air pressure and the low air pressure warning circuits are triggered and connected via linkage mechanism under command, which can prolong the lifespan of the battery and the vehicle tire warning system.

Other advantages and novel features of the present invention will be clearly drawn from the following detailed description of the preferred embodiments with the attached drawings, in which:

DETAILED DESCRIPTION OF THE INVENTION

Figure 1:
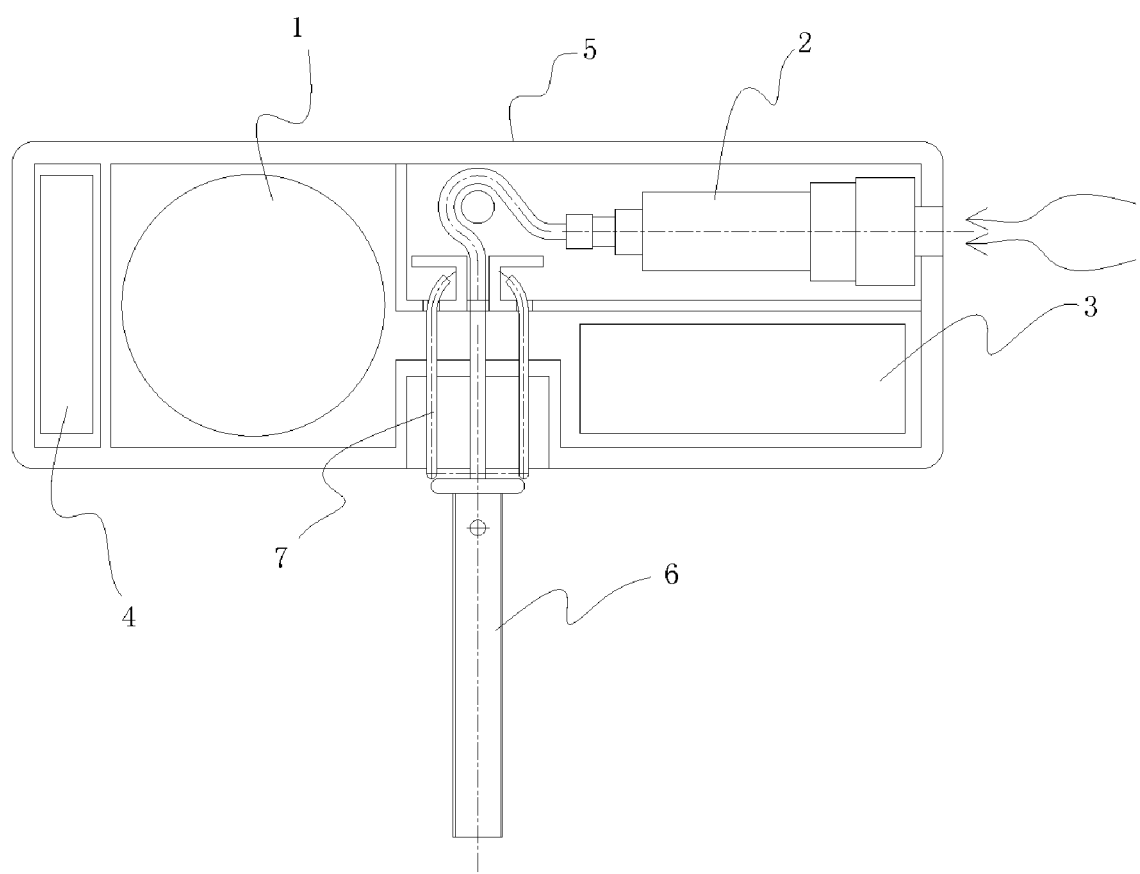
FIG. 1 depicts an explanatory block diagram of a vehicle tire warning system according to one embodiment of the present invention, wherein for the sake of clarity, a receiving device is not shown.

Referring to FIG. 1, a vehicle tire warning system according to one embodiment of the present invention includes an independent power source 1, an air pressure sensor 2, a temperature sensor 3, a transmitting device 4 and a receiving device (not shown). The case 5 is divided into several individual sections in communication with each other, and the independent power source 1, the air pressure sensor 2, the temperature sensor 3 and the transmitting device 4 are correspondingly arranged in a section of the case 5. The independent power source 1 powers the air pressure sensor 2, the temperature sensor 3 and the transmitting device 4. The independent power source 1 can be various known batteries in the art.

Figure 3:
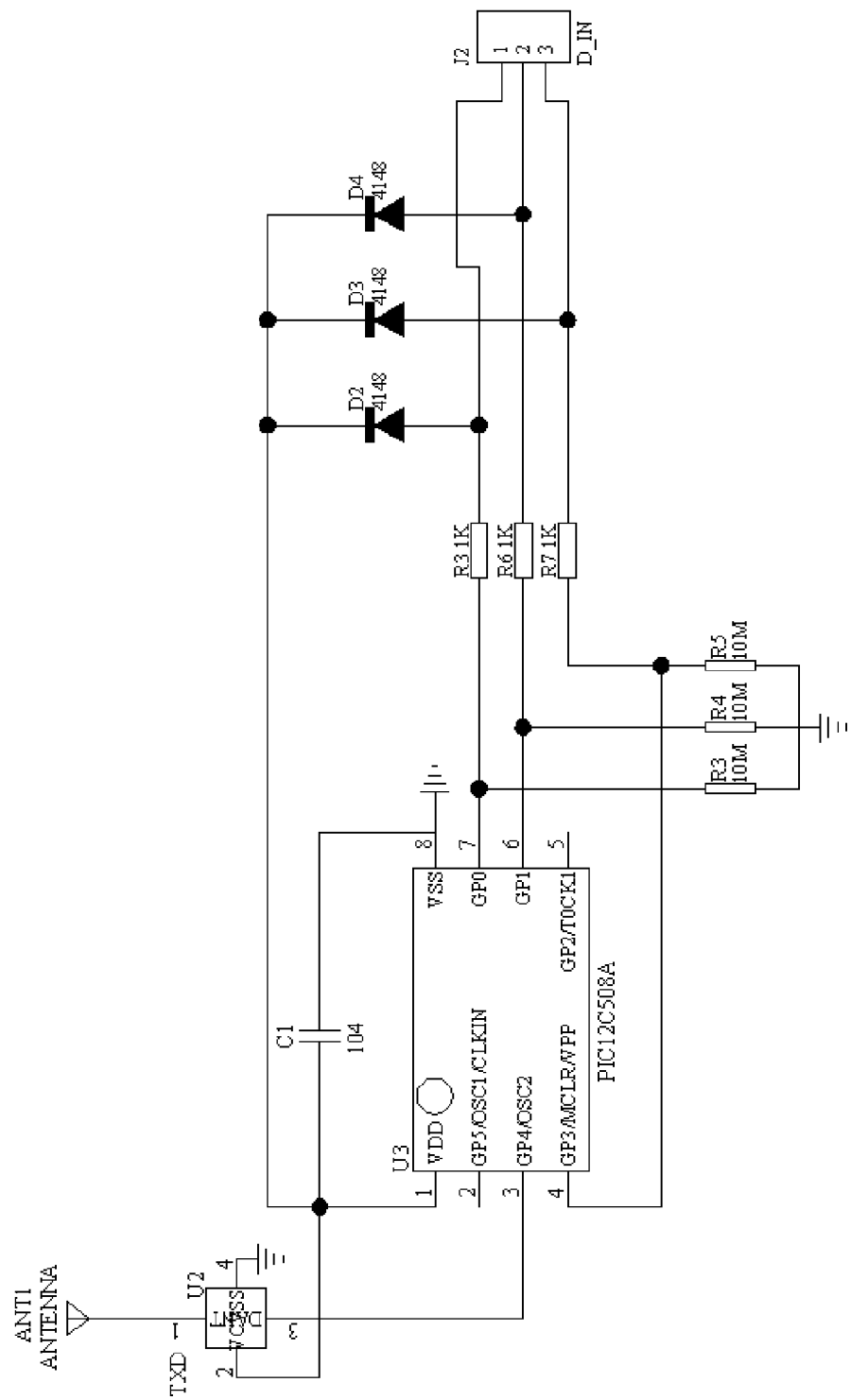
FIG. 3 depicts an explanatory circuit diagram for a transmitting device of the vehicle tire warning system shown in FIG. 1.

The air pressure sensor 2 for detecting the air pressure and the temperature sensor 3 for detecting the temperature each is electrically connected to the transmitting device 4. The detected data of the air pressure and the temperature is transmitted to the transmitting device 4 in term of electrical signals and, thereafter, be outputted to the atmosphere via a transmitting circuit as shown in FIG. 3 of the transmitting device 4. The receiving device can be installed in the vehicle, for instance in an instrument panel of the vehicle. The transmitting device can detect the temperature and the air pressure according to the electrical signals, and further drive warning equipments, for instance horns, display screens and warning lights, to remind the drivers of the danger.

Figure 2:
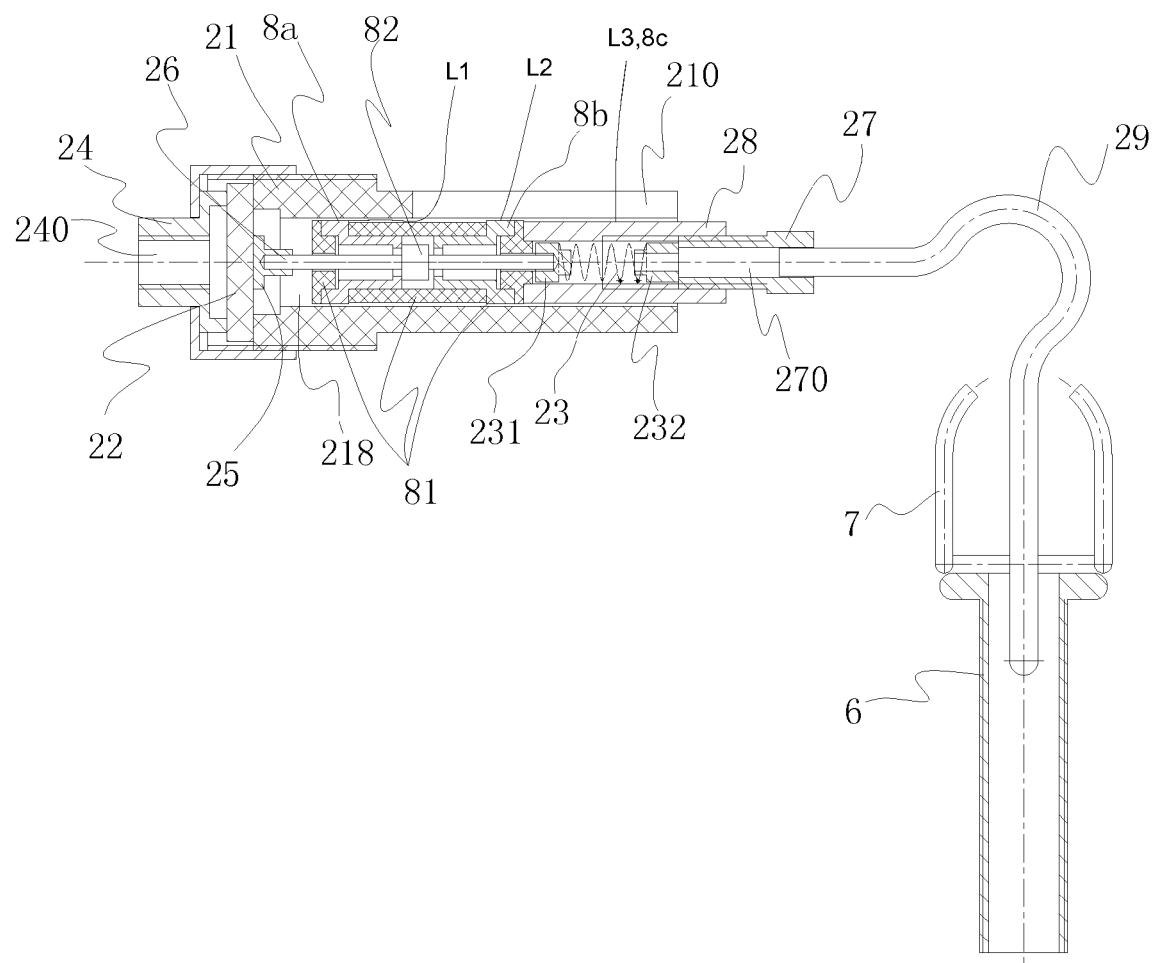
FIG. 2 depicts an explanatory sectional view of an air pressure sensor for the vehicle tire warning system shown in FIG. 1, wherein a standard tire valve and a bracket are shown.

Referring to FIG. 2, the air pressure sensor 2 includes a tubular housing 21 having a chamber 218 defined therein, an air pressure actuating device, a connecting pipe 29 and a switch device.

The tubular housing 21 is made from plastic material having a predetermined rigidity. The left side of the tubular housing 21 is designed to sense the air pressure in the vehicle tire. The right side of the tubular housing 21 is configured to communicate with the atmosphere to have a same air pressure as that of the atmosphere. The tubular housing 21 is also provided with an aperture 210 at an upper side thereof and three leading-out wires L1, L2, L3 for electrically connecting the air pressure sensor 2 to the transmitting circuit of the transmitting device 4. Understandably, the tubular housing 21 is preferably properly sealed where the leading-out wires L1, L2, L3 extend out of the tubular housing 21.

The air pressure actuating device includes a flexible pressure sensitive element 22, a linkage mechanism, an elastic element 23 and a supporting mechanism. The flexible pressure sensitive element 22 is made from plastic material which has a predetermined elasticity. The flexible pressure sensitive element 22 can be configured to have a drum shape and can be disposed at the left side of the tubular housing 21. Alternatively, the flexible pressure sensitive element 22 can also be configured as a circle piece that is positioned at the entrance of the tubular housing 21. To strengthen the connection of the flexible pressure sensitive element 22 and the tubular housing 21, the vehicle tire is also provided with a tubular fastener 24 at a left side thereof. The fastener 24 can resist the flexible pressure sensitive element 22 against the tubular housing 21 so as to enforce the connection between the tubular housing 21 and the flexible pressure sensitive element 22. The fastener 24 is correspondingly provided with an air inlet 240. Air in the vehicle tire can enter the air inlet 240 and further acts on the flexible pressure sensitive element 22.

The linkage mechanism suitably received in the tubular housing 21 is seated at the right side of the flexible pressure sensitive element 22. The linkage mechanism includes a T-shaped linking base 25 and a core shaft 26. The linking base 25 is attached to a right side wall of the flexible pressure sensitive element 22 and the core shaft 26 is securely coupled to the linking base 25. When the flexible pressure sensitive element 22 expands or shrinks due to air pressure change in the vehicle tire, the linking base 25 will also pushes the core shaft 26 to move back and forth in the tubular housing 21.

The tubular housing 21 is provided with a supporting mechanism at right side of the core shaft 26. The supporting mechanism includes a sleeve 28 having inner thread and a securing element 27 securely coupled to the sleeve 28. The sleeve 28 is attached to the inner wall of the tubular housing 21 via glue or other known means to ensure the air tightness. In the present embodiment, the securing element 27 is a screw having a through hole 270 defined therein. Therefore, the securing element 27 can be screwed to the sleeve 28 and the through hole 270 here acts as the only air passage in communication with the chamber 218.

The connecting pipe 29 has a curved shape in conformity with the internal lay out of the case 5. One end of the connecting pipe 29 is inserted into the through hole 270 of the securing element 27. The other end of the connecting pipe 29 is inserted into a standard tire valve 6 to directly communicate the chamber 218 of the tubular housing 21 with the atmosphere outside of the vehicle tire. Therefore, the air pressure in the chamber 218 of tubular housing 21 is the same as that in the atmosphere. The standard tire valve 6 is securely coupled to the case 5 via a bracket 7 provided between the standard tire valve 6 and the case 5.

An elastic element 23 is arranged between the securing element 27 and the core shaft 26. The elastic element 27 can be a cylindrical spring or a conical spring for saving space. Referring particularly to FIG. 2, the right side of the core shaft 26 and the left side of the securing element 27 each is provided with a spring seat 231 and 232. In installation, two distal ends of the elastic element 23 are mounted on the two spring seats 231 and 232, respectively.

The tension of the elastic element 23 can be precisely adjusted via adjusting relative relationship between the securing element 27 and the sleeve 28, so as to initially set the position of the linkage mechanism as well as regulate the sensible value of the air pressure sensor.

A switch device is disposed in the chamber 218 of the tubular housing 21 of the air pressure sensor 2. The switch device includes a supporter 81, a conductive metal lug boss 82 and three conduct pieces 8a, 8b and 8c. The first conduct piece 8a and the second conduct piece 8b are fixed to the inner wall of the tubular housing 21 and each extends toward the core shaft 26. The lug boss 82 is formed on the core shaft 26 of the linkage mechanism and initially positioned apart from the first conduct piece 8a and the second conduct piece 8b. Movement of the linkage mechanism in horizontal direction due to air pressure change in the vehicle tire can urge the lug boss 82 to contact the first conduct piece 8a or the second conduct piece 8b.

Referring to FIG. 3, the first conduct piece 8a and the second conduct piece 8b are electrically connected to a low air pressure warning circuit and a high air pressure warning circuit, respectively. The supporting mechanism acts as a shared third conduct piece 8c of the low air pressure warning circuit and the high air pressure warning circuit. If the air pressure in the vehicle tire increases/reduces, the linkage mechanism actuates the lug boss 82 to move right/left to contact with the second conduct piece 8b/first conduct piece 8a and electrically connect the high air pressure warning circuit/low air pressure warning circuit including the lug boss 82, the second conduct piece 8b/first conduct piece 8a, right end of the core shaft 26, the spring seat 231 at right side of the core shaft 26, the elastic element 23, the spring seat 232 and the securing element 27 and the sleeve 28 of the supporting mechanism. The lug boss 82 can be initially positioned apart from the first conduct piece 8a and the second conduct piece 8b via adjusting the securing element 27, so as to cut off the low air pressure warning circuit and the high air pressure warning circuit and, thereby defining a standard non-warning status.

Referring particularly to FIG. 2, there are three leading-out wires L1, L2, L3 extend into the inner side of the tubular housing 21 via the aperture 210. The leading-out wires L1, L2, L3 each is connected to a corresponding conduct piece 8a, 8b and 8c via soldering. Therefore, the conduct piece 8a, 8b and 8c can be electrically connected to the transmitting circuit as shown in FIG. 3 of the transmitting device 4 and, thereby forming a high air pressure warning circuit and a low air pressure warning circuit.

The supporter 81 of the switch device is made from an electrically insulating material and has a substantially tubular configuration for enclosing the first conduct piece 8a and the second conduct piece 8b. The supporter 81 is securely fixed to the inner wall of the tubular housing 21. The linkage mechanism is properly housed in the supporter 81 and vertical movement of the core shaft 26 thereof in the tubular housing 21 is reasonably limited.

As an alternative embodiment of the present invention, one end of the tubular housing 21 can also be integrally formed with the supporting mechanism. However, in this alternation, the securing element 27 cannot be used to adjust the tension of the elastic element 23 and the initial position of the conductive lug boss 82. Understandably, there are still other well known alternations or modifications in the art.

In the above described embodiment, the chamber 218 in the tubular housing 21 of the air pressure sensor 2 has a same air pressure as that of the outside atmosphere. Control of the warning circuit can be realized via the air pressure actuating device, even though the chamber 218 is not strictly vacuumed.

Referring again to FIG. 1, the temperature sensor 3 for the vehicle tire warning system is a bimetal memory alloys sensor as those have already been disclosed in prior applications of the inventor. The temperature sensor 3 is provided with a memory alloy sheet and a conductive metal both enclosed by a sealed package. When the temperature in the vehicle tire reaches a predetermined level, the memory alloy sheet of the temperature sensor 3 will deform and cooperate with the conductive metal to form a circuit which will be further electrically connected to the transmitting circuit as shown in FIG. 3 of the transmitting device 4. Therefore, temperature data in the vehicle tire can be transmitted to the receiving device via wireless coding transmitting circuit.

Figure 4:
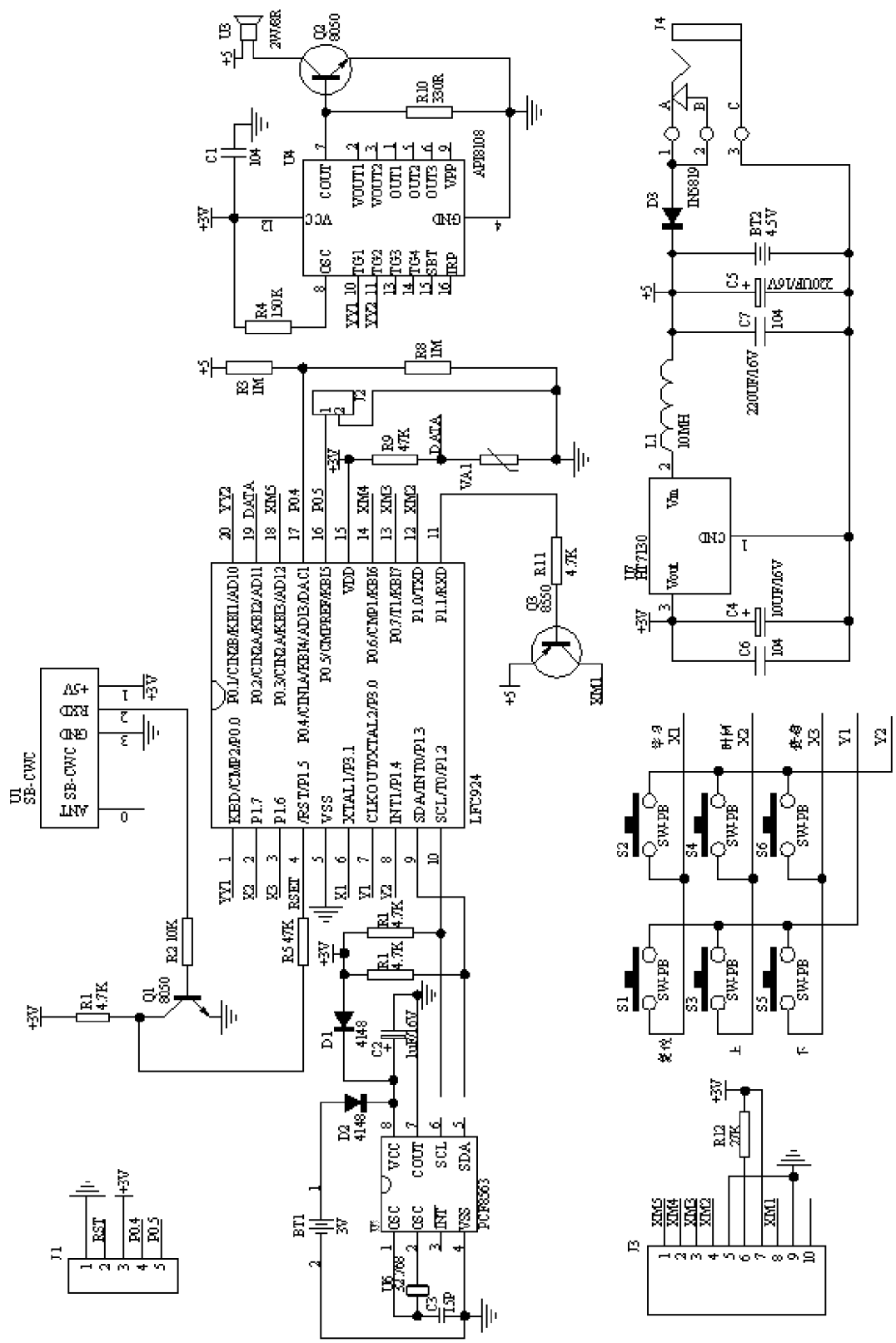
FIG. 4 depicts an explanatory circuit diagram for a receiving device of the vehicle tire warning system shown in FIG. 1.

Referring to FIG. 1, FIG. 3 and FIG. 4, the circuits for the vehicle tire warning system includes a transmitting circuit of the transmitting device 4 and a receiving circuit of the receiving device. The transmitting device 4 and the receiving device are the same as those have been well known to one ordinary skilled in the art and will not be explained in detail here.

Referring particularly to FIG. 3, the transmitting circuits for the transmitting device 4 include a high air pressure warning circuit and a low air pressure warning circuit. The high air pressure warning circuit and the low air pressure warning circuit, together with the three leading-out wires of the air pressure sensor 2, can distinguish different air pressures and induce the transmitting circuits to transmit various marking signals to the receiving circuits so as to warn correctly. According to the present invention, the working frequency for the transmitting device 4 and the receiving device is 315 MHz, and the effective transmission range thereof is 30 meters, which can surely meet the requirements of daily monitoring of various kinds of vehicle tires.

Therefore, the vehicle tire warning system in accordance with the embodiment of the present invention can detect the air pressure and the temperature in the vehicle tire. The temperature and the air pressure in the vehicle tire can be respectively detected via the air pressure sensor 2 and the temperature sensor 3. When the temperature or the air pressure exceed the predetermined level, the temperature sensor 3 and the air pressure sensor 2 will trigger the transmitting device 4 to transmit warning signals. The receiving device receives and processes the warning signals and indicates the dangerous status via speech warning system, voice warning or red light warning.

Referring to FIG. 3, the transmitting device 4 utilizes the voltage difference between the supplying voltage for the sensor and the working voltage for a 8 bit single chip PIC12C508A. It includes three ordinary diodes D2, D3 and D4 whose forwards are connected to the leading-out wires L2 under high air pressure, L1 under low air pressure, output port of the temperature sensor 3 and the VDD port of the PIC12C508A, to form a switching signal circuit and optimize power consumption of the transmitting device 4.

If the vehicle tire works under normal conditions, the sensor does not output signal and is set in a low voltage. The diodes pinch-off. The control chip is set in a sleep stage. There is no power consumption. If the sensor detects a danger status, the sensor outputs a high voltage signal to conduct the diodes and provide the VDD end with a threshold voltage to activate the control chip PIC12C508A of the transmitting device 4 to work. At the same time, D_IN ports provide the GP0/GP1/GP3 of the PIC12C508A with marking signals via 1K resistances indicating temperature warning, high air pressure warning and low air pressure warning to further form a temperature warning circuit, a high air pressure warning circuit and low air pressure warning circuit, respectively. Thus, automatic recognition of the dangerous parameters is obtained. The marking signals are processed by the single chip PIC12C508A. The warning signals are transmitted via port GP4. The coding chip PT2240B codes the warning signal impulse and transmits out the coded signals via an antenna.

Referring to FIG. 4, the receiving circuit for the receiving device includes a 315 MHz radio frequency receiving module, a LPC924 single chip controlling circuit, an AP18108 speech generating circuit, a PCF8563 clock signal impulse occurring circuit and a 3V/5V steady voltage circuit. When the radio frequency receiving module receives the data, the RXD port triggers the triode 8050 to conduct and, therefore, control the RESET port of LPC924. LPC924 will reset the signals and receive synchronous codes, to realize synchronization of the signals at the transmitting side and processing and receiving of the signals in the module. At the same time, ports X1, X2, X3, Y1, Y2 are properly set so that the single chip can record and memorize the parameter range to be detected. The single chip LPC924 still can program and control the speech generating circuit by programming and controlling the speech chip AP18108 via P0.0, P0.1, so as to output speech warning reminding, such as "high temperature, please check", "high air pressure, please check", "low air pressure, please check". Additionally, LPC294 can also issue the warning via LED, for instance the status warning and the temperature warning.

In view of the previous description, the vehicle tire warning system according to the preferred embodiment of the present invention is simple and cheap, and has a long lifespan.

While the present invention has been illustrated by the above description of the preferred embodiments thereof, and while the preferred embodiments have been described in considerable detail, it is not intended to restrict or in any way limit the scope of the appended claims to such details. Additional advantages and modifications within the spirit and scope of the present invention will readily appear to those skilled in the art. Therefore, the present invention is not limited to the specific details and the illustrative examples shown and described.

What is claimed is:

1. An air pressure sensor for a vehicle tire warning system, comprising:
   a tubular housing having a chamber defined therein, the chamber being communicated to the atmosphere via a connecting pipe;
   an air pressure actuating device suitably seated in the chamber and being moveable back and forth in the chamber in response to air pressure change in the vehicle tire; and
   a switch device adapted to electrically connect a high air pressure warning circuit or a low air pressure warning circuit under the drive of the air pressure actuating device;
   wherein the air pressure actuating device comprises a flexible pressure sensitive component for sensing the air pressure in the vehicle tire, a linkage mechanism assembled to the flexible pressure sensitive component, a supporting mechanism coupled to the tubular housing, and an elastic element between the supporting mechanism and the linkage mechanism, the flexible pressure sensitive component drives the linkage mechanism to move back and forth in the chamber in response to air pressure change in the vehicle tire; and wherein the supporting mechanism comprises a sleeve assembled to the tubular housing and a securing element engageably coupled to the sleeve, the securing element is provided with a through hole for suitably receiving the connecting pipe.

2. The air pressure sensor of claim 1, wherein the supporting mechanism correspondingly defines a through hole for suitably receiving the connecting pipe.

3. The air pressure sensor of claim 1, wherein the vehicle tire is provided with a fastener defining an air inlet, and wherein the fastener resists the flexible pressure sensitive component against the tubular housing.

4. The air pressure sensor of claim 1, wherein the linkage mechanism comprises a linking base formed on the flexible pressure sensitive component and a core shaft attached to the linking base.

5. The air pressure sensor of claim 1, wherein the linkage mechanism and the supporting mechanism each is provided with a spring seat and the elastic element is set between the two spring seats.

6. The air pressure sensor of claim 5, wherein the elastic element is a cylindrical spring or a conical spring.

7. The air pressure sensor of claim 1, wherein the connecting pipe has a curved shape.

8. The air pressure sensor of claim 1, wherein the switch device comprises a conductive lug boss on the linkage mechanism and a first conduct piece and a second conduct piece at two sides of the conductive lug boss, the first and second conduct pieces are fixed to the tubular housing and electrically connected to a high air pressure warning circuit and a low air pressure warning circuit, respectively, the supporting mechanism acts as a shared conduct piece of the high air pressure warning circuit and the low air pressure warning circuit, the conductive lug boss is initially positioned apart from the first and second conduct pieces to cut off the low air pressure warning circuit and the high air pressure warning circuit, and is actuated to contact with the first conduct piece or the second conduct piece in response to the air pressure change in the vehicle tire to electrically connect the high air pressure warning circuit or the low air pressure warning circuit.

9. The air pressure sensor of claim 8, wherein the tubular housing is provided with an aperture, the conduct pieces each is coupled with a leading-out wire, and the leading-out wires extend outside of the tubular housing via the aperture.

10. The air pressure sensor of claim 9, wherein the switch device comprises electrically insulating supporters enclosing the first and second conduct pieces and fixed to the inner wall of the tubular housing, and the supporters each defines a passage to suitably receive the linkage mechanism.

11. A transmitting circuit for a vehicle tire warning system to transmit wireless signals via trigger and connection of an air pressure sensor, the transmitting circuit is controlled via an eight bit single chip PIC12C508A, VDD end of the single chip is connected to D_IN output ports of the air pressure sensor via three diodes to form a signal switching circuit; on detecting danger signals, the air pressure sensor outputs a high voltage to conduct the diodes and provides the VDD end with a threshold voltage to activate the PIC12C508A to work, D_IN ports each provides GP0/GP1/GP3 with marking signal via 1K resistances to respectively indicate temperature warning, high air pressure warning and low air pressure warning, the single chip PIC12C508A processes the marking signals and outputs warning signals via a GP4 port, a coding chip PT2240B codes the warning signal impulses and transmits the coded signals via an antenna.

* * * * *